April 25, 1933.  O. HOPPE  1,905,382
MILLING OR CUTTING MACHINE
Filed May 12, 1927   3 Sheets-Sheet 1

INVENTOR
Oscar Hoppe
By B. Singer, Atty

April 25, 1933. O. HOPPE 1,905,382
MILLING OR CUTTING MACHINE
Filed May 12, 1927   3 Sheets-Sheet 2

INVENTOR
Oscar Hoppe
By B. Singer, atty.

April 25, 1933.    O. HOPPE    1,905,382
MILLING OR CUTTING MACHINE
Filed May 12, 1927    3 Sheets-Sheet 3

INVENTOR
Oscar Hoppe
By D. Singer, atty.

Patented Apr. 25, 1933

1,905,382

UNITED STATES PATENT OFFICE

OSCAR HOPPE, OF RORSCHACH, SWITZERLAND

MILLING OR CUTTING MACHINE

Application filed May 12, 1927, Serial No. 190,898, and in Germany February 11, 1927.

This invention relates to milling or cutting machines and refers more particularly to the feed mechanism for the work tables or supports of such machines of the kind in which after the termination of the cutting stroke the work table is automatically and quickly returned to its starting or initial position.

The essential feature of the invention resides in the fact that the feed mechanism is so constructed that, after the end of the working stroke of the cutting or milling table, this latter together with the work piece is automatically lowered through a short distance, which is however sufficient for preventing any injurious contact between the workpiece and the cutting tool on the subsequent quick return movement of the work table, while at the end of the return stroke, the milling or cutting table is again raised precisely to the correct height for the next operation of milling or cutting.

In particular the vertical displacement of the work table at the end of the working stroke is effected by an excentric loop in connection with the reversing lever of the feed mechanism, which loop in turn controls a coupling, preferably a frictional conical coupling, through which the movement of the vertical spindle for raising or lowering the work table is effected so that by simple means and without the use of any intermediate mechanisms a determined movement of the vertical spindle takes place at the same instant as the quick return movement is thrown into or out of gear.

In order that the invention may be clearly understood, it will now be described with reference to the accompanying drawings, which illustrate one constructional form of mechanism according to the invention, by way of example.

Figure 1:
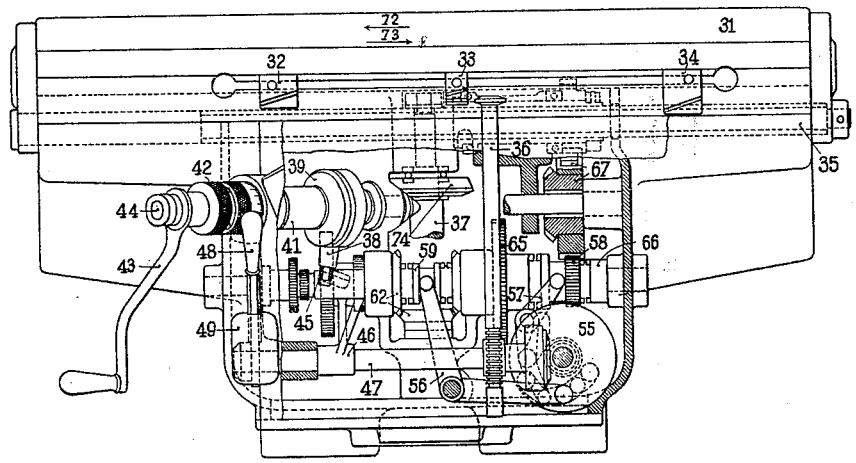
Fig. 1 shows partly in elevation and partly in section the bed of the work table provided with the feed mechanism.
Figure 2:
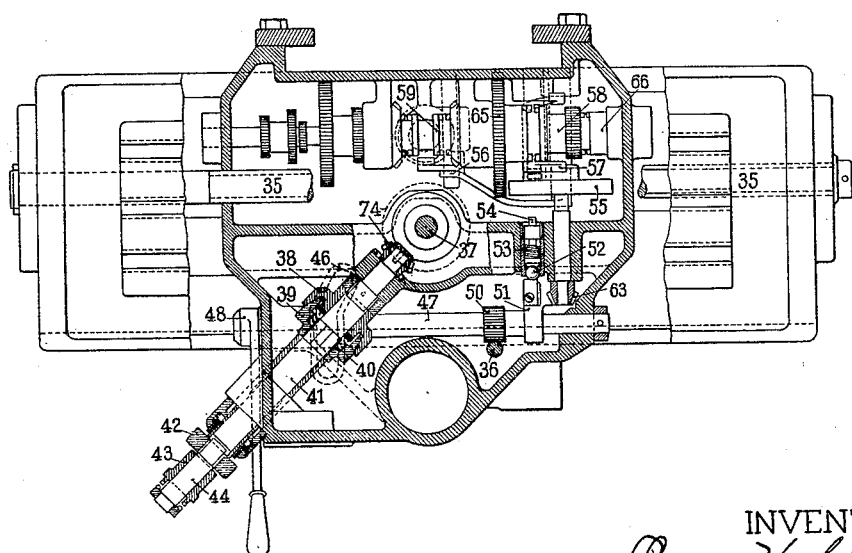
Fig. 2 is a plan, partly in section.
Figure 3:
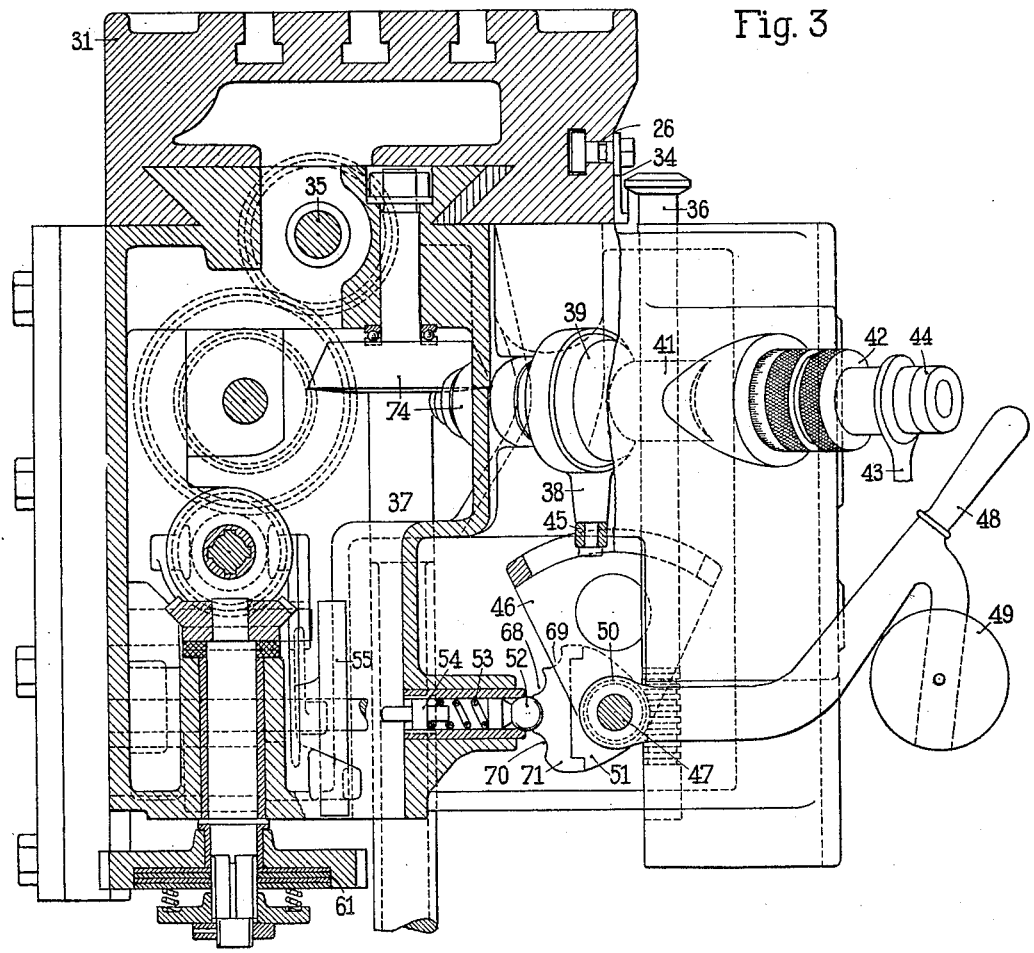
Fig. 3 is a vertical section.
Figure 4:
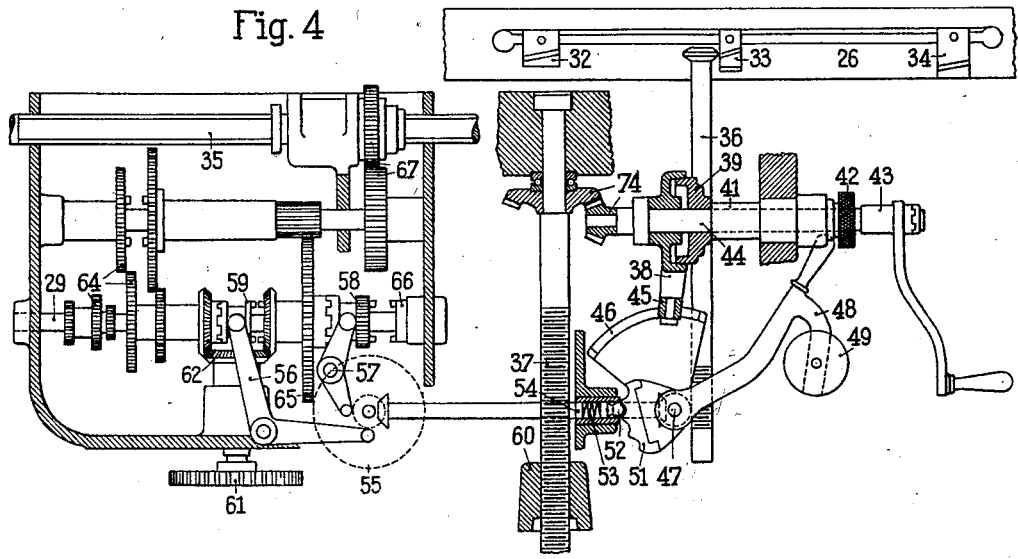
Fig. 4 is an elevation, similar to Fig. 1, but with parts of the operating mechanism disengaged from one another.
Figure 5:
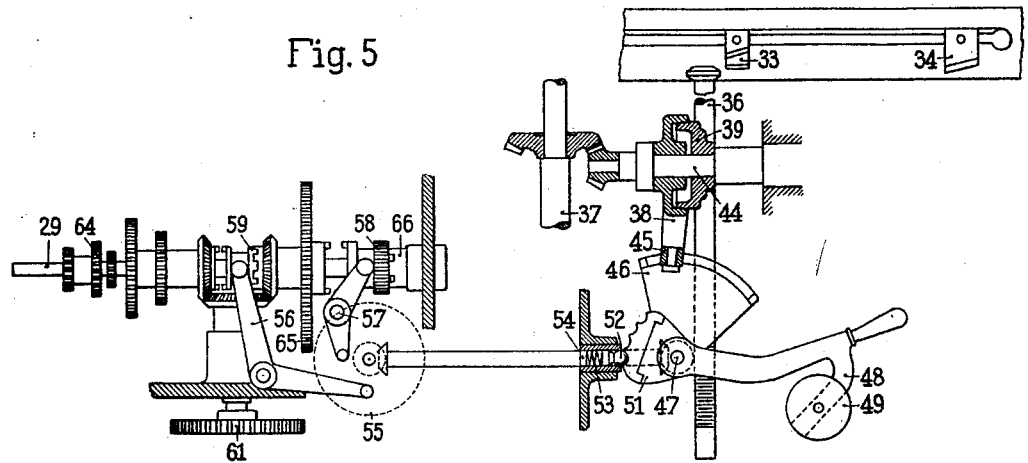
Fig. 5 is a similar view with the parts in a different working position.

Referring to Figs. 1 to 3, from a vertically arranged toothed gearing located in the framework of the milling machine the feed is transmitted to the wheel 61, Fig. 3, and thence to the reversing mechanism 62, Figs. 1, 4 and 5. According to whether the coupling sleeve 59, Figs. 1, 2, 4 and 5, is in engagement with the left hand or right hand bevel wheel of the reversing gear 62 the travel of the longitudinal slide or work table 31 takes place in one or other direction.

The coupling sleeve 59 is controlled by the lever 56 from the cam 55, Figs. 1, 4 and 5. The cam 55 in turn is interconnected with the manually operated reversing lever 48 through a spindle 47 and a pair of bevel wheels 63, see Figs. 1, 2, 4 and 5. Furthermore on the spindle 47 is mounted the toothed wheel 50, see Fig. 2, with which meshes the rack portion of a movable controlling bolt 36. If the reversing lever 48 is operated, and the spindle 47 and the toothed wheel 50 consequently moved, then the movable bolt 36 is raised or lowered as the case may be. The adjustment of the spindle 47 as well as of the reversing lever 48 may be shown on a suitable index or may be indicated to the touch. For this purpose the reversing lever is provided with engaging notches for its principal adjusted positions, see for instance Figs. 3, 4 and 5. In these notches engages a locking ball 52 which is pushed forwards by means of a spring 53, the pressure of which spring can be regulated by a screw 54, and this holds the reversing lever 48 in any one of its principal positions.

From the coupling sleeve 59 is transmitted through the gearing 64, Fig. 4, the feed drive to the gear wheel 65, see Figs. 1 and 2, which wheel 65 is provided with a portion of a clutch. On the same spindle as the wheel 65 is also mounted the high speed coupling 66, see Figs. 2 and 4, which in turn is adapted to be brought into direct engagement with the coupling sleeve 59 and consequently turns with a greater velocity of rotation than the wheel 65 which only receives its drive through the feed wheel 64.

Both the feed wheel 65 as also the high speed coupling 66 may be coupled with the coupling sleeve 58 which is provided with a toothed wheel which by means of an intermediate wheel 67 (Figs. 1 and 4), drives the longitudinally extending spindle 35 of the table. According to whether the coupling sleeve 58 is in engagement with the feed wheel 65 or with the high speed coupling 66, the slide moves with feed speed or with high speed, whilst the direction of the movement of the table can be reversed by moving the coupling sleeve 59.

According to the invention the coupling sleeve 58 can also be controlled from the cam 55 through the interposition of a lever 57, see Figs. 1, 2, 4 and 5. As a consequence the forward and backward movement of the work table can be effected with the normal velocity and feed and at high speed by means of the cam 55 and from the reversing lever 48 or from a controlling bolt 36 (compare Figs. 3, 4 and 5).

When the reversing lever 48 is moved upward from the normal position shown in Figure 3 so that the locking bar 52 enters the notch 68 and so that at the same time owing to rotation of the gear 50, the bolt 36 is moved upward and the shaft 27 is rotated, which shaft 27 is in functional engagement with the setting shaft 47 through the bevel gearing 63. This shaft also is in functional engagement with the cam discs 55 on shaft 27. The levers 56, 57 are guided by two cam discs 55 and owing to these shafts and cams, the feed gearing is thrown into action through the clutch sleeve 59 on shaft 29 with the effect that the longitudinal carriage is advanced towards the right at a proper operative speed, see the arrow 73 in Figure 1.

When the reversing lever 48 is moved upward until the bar 52 drops into the notch 69, the normal feed is disconnected upon reversion of the lever 57 owing to the fact that the cam disc 55 is advanced a certain angle. When the normal feed is disconnected, a rapid feed of movement in the same direction is substituted, that is, a movement towards the right.

If the reversing lever 48 is moved downward until the bar 52 drops into the notches 70 or 71 the movement of the lever 48 also causing downward movement of the bolt 36, the feed gearing also is thrown into operation but in the opposite direction towards the left or upon entry of the bar 52 into the notch 71 a rapid movement towards the left is substituted as indicated by the arrow 72, Figure 1. The same connections may also be effected through the setting lever 48 by lifting or lowering the bolt 36, said bolt having a head with conical surfaces.

Three lugs 32, 33 and 34 are mounted on the longitudinal carriage so as to be adjustable in the slot 26. These lugs are provided with slanting cam surfaces 32$^a$, 33$^a$, 34$^a$ respectively and when they pass either above or below the head of the bolt 36, upon longitudinal travel of the carriage they either lift said head or press it downward. The movement of this head and the bolt to which it belongs actuates the shaft 47 through the gear 50. Rotating this shaft 47 in one or the other direction the positions will be determined by the notches into which the locking pawl 52 drops. The lug 33, for instance, as shown in Figures 1 and 5, shifts the bolt 36 from its position "rapid movement right" to operative feed right. The lug 32 moves the bolt from the position "operative feed right" to neutral position, the gearing being maintained in operation by the weight 49 on the lever 48 so that the gearing is reversed to rapid movement left in direction of the arrow 72, Figure 1. The gearing remains in this condition until the bolt 36 is again lifted by the lug 34 to return it to original position and to cause the carriage to stop. By adjustment of these lugs 32, 33 and 34 the operator, therefore, is enabled to control the movement of the carriage towards the left and towards the right to vary the length of the strokes and to stop the table at predetermined points.

If the weight 49 were not present on the handle 48 (see for instance Figs. 3 and 4 of the drawings), then at the end of the length of the cut, that is when the working piece with its surface to be cut has just passed the cutter, the movement transferred by the cam 32 to the bolt 36 would be interrupted by the segment 51 which is provided with notches 70 or 71 respectively, in which notches the locking ball 52 is pressed forward by spring 53. The curved slot 46 then could not further transfer its movement upon the horizontal shaft 44 and upon its bevel wheels 74 attached thereon. The weight 49 is provided in order to overcome this locking by the segment 51 having notches and the spring system. An automatic movement is therefore given to the steering members so that the table is lowered after the completion of the milling way and its reverse movement (at high speed in reverse) is started. The movement of the adjusting bolt 36 is therefore started by the cam 32 and thereby the one of the segment 51 and of the curved slot 46. This movement is then completed by the effect of the weight 49 which overcomes the counter effect of the locking notches 70 or 71 respectively, and of the locking ball 52 pressed into the notches by spring pressure.

If, on the other hand, a working piece is exchanged and a new one is to be cut, the feeding movement is started again by means of the reverse lever 48.

In this way the control of the work table can be effected immediately by hand through the operation of the reversing lever 48, but in addition it may be effected automatically from the controlling bolt 36, which is adapted to engage with camlike surfaces 32, 33, 34 carried by the work table or formed thereon in various required positions and which are at different elevations, so that the bolt is correspondingly raised or lowered. Thus, for example, the cam surface 33, Figs. 1 and 4, is adapted to move the bolt 36 downwardly from the position of "high speed to the right" to "feed to the right", the cam surface 32 is adapted to move the bolt 36 further downwardly from the position "feed to the right" into the stopping position, whereupon a further movement of the bolt 36 is caused because after the passage of the cam 32 and the disengagement of the element 52 the reversing lever 48 drops down under the influence of a weight 49, so that the parts come into the position for "high speed to the left", in the direction of the arrow 72, Fig. 1, and this is continued until the bolt 36 is raised by the camlike surface 34 and brought back to the raised position and the longitudinally moving slide is stopped.

The bolt 36 has two functions. It causes rotation of the shaft 47 by means of the bevel gearings, cam discs 55 and clutches 58 and 59 and secondly it moves the table upward or down by means of the spindle 37 utilizing for this purpose the slot 46, the lever 38 and the bevel gearing 74. The friction gearing 38—9 is eliminated only whenever the working table is raised or lowered by the hand crank 43 (see Figure 4).

Now in order, during high speed movement, to depress the table through a determinable distance and to raise it on the stoppage of the longitudinally moving slide, the vertical spindle 37 of the slide which is in screw threaded engagement with the support 60, see Figs. 1 and 4, is adapted to be operated in a special manner. In the first place it can be operated by means of a handle 43 through a spindle 44 and a pair of bevel wheels 74, see Figs. 1, 2, 4 and 5. The handle 43 in turn can be coupled by means of a clutch with the spindle 44. On the spindle 44 is a friction coned clutch 38, 39, see Figs. 1 and 2, and also compare Figs. 4 and 5. The coned member 38 is mounted loosely on the spindle 44 while the inner coned member 39 is keyed to said shaft. The frictional engagement can be increased by means of a nut and sleeve adjustment 42, 41, so that the coned member 38 transmits the rotation to the vertical spindle 37. In connection with the coned surface 38 and carried by an arm is a roller 45 which is adapted to move in a curved slot 46 in a plate. This slotted plate is in fixed connection with the spindle 47, that is it follows the same movement as the reversing lever 48 and further moves in sympathy with the bolt 36.

Figure 6:
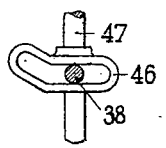
Fig. 6 is a diagram of the curved or excentric loop for operating the coupling.
Figure 6A:
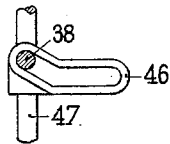
Figs. 6a and 6b show the parts in different positions.
Figure 6B:
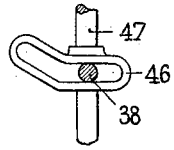

The curved slot in the disc 46 is so shaped as shown at Figs. 6, 6a and 6b, that for a portion of the movement of rotation of the curved slot corresponding to movement forward and movement backwards of the work table no motion of rotation is transmitted to the friction sleeve 38 through the roller 45, whereas in the extreme position of the work table a motion of rotation is transmitted from the curved slot to the coupling sleeve 38 and from the said sleeve through the movement of the coupling 38, 39 and through the rotation of the element 42 to the bevel gearing 74 and to the spindle 37, whereby the minute raising or lowering of the work table is effected at the end of the path of travel or at the end of the feed or return movement.

If now raising and lowering of the table are to be effected from the handle 43, then by means of the adjusting nut 42 and the sleeve 41, the engagement of the coupling 38, and 39 is loosened, so that on the rotation of the handle 43, the spindle 44 and consequently the bevel gear 74 are operated, but not in this case the coupling member 38 which is mounted loosely on the spindle 44.

In order to make the method of operation absolutely clear it may be remarked that in Figs. 1, 2 and 3, the couplings are in the rest position whereas in Fig. 4, the mechanism is in the feeding position with the table moving towards the left, that is to say in the movement for work. In this case the coupling sleeve 59 is moved towards the left, the coupling sleeve 58 is coupled to the feed wheel 65, the reversing lever 48 is raised as also the bolt 36, whilst the locking ball 52 is in engagement with the notch 68. The roller 45 is in the position shown at Fig. 6b in the curved slot 46 so that a vertical movement of the table is not taking place.

On the other hand Fig. 5 illustrates the high speed movement of the table towards the right (that is the quick return movement). The reversing lever 48 has automatically dropped down under the influence of the weight 49, the coupling sleeve 59 has been moved to the right, the coupling sleeve 58 is in engagement with the high speed coupling element 66, the locking ball 52 is in engagement with the notch 72. The position of the roller 45 in the curved slot 46 is shown at Fig. 6a. The roller is in the inclined portion of the curved slot in the plate 46 and has caused a part rotation, which through the intervention of the pair of bevel wheels 74 has been transmitted to the vertical spindle, so that the table has been lowered through the required distance for disengaging the work piece from the tool.

Figure 7:
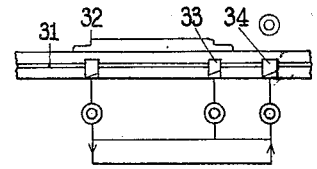
Fig. 7 shows diagrammatically the return path of the work piece or milling table.

Fig. 7 shows a diagram of the working. The reversing lever has been set to the high speed position. The longitudinal slide member is proceeding from the high speed position to the working position. The cam member 33 is transforming the high speed movement into the feed movement, the cutting tool is in engagement with the work piece and is working over it. At the moment in which the cutting tool leaves the work piece, the cam member 32 cuts out the feed, and the weight 49 in connection with the reversing lever 48 brings in the high speed backward movement. At the same time the work table drops down in the manner already explained in order to bring the work piece out of engagement with the cutting tool. After the termination of the high speed backward movement the cam member 34 stops the slide and at the same time through the reversal of the lever 48 by means of the adjusting bolt 36 and the cam member 34, the work table is again raised automatically into the working position so that a new working stroke can be performed.

What I claim and desire to secure by Letters Patent in the United States of America is:—

1. In a milling machine, a vertically movable frame, a work table movable longitudinally on said frame, a vertical screw shaft to raise and lower the frame and hence also the table, a shaft geared to the screw shaft, a member on the last named shaft to partly turn the latter, a controlling shaft having a cam to operate said member, a controlling bolt geared to the controlling shaft and having a head, and spaced cams on the longitudinally movable work table, in the path of which the head of the controlling bolt is arranged, said cams coacting with the head to move the bolt upwardly or downwardly according to the direction of longitudinal movement of the table and thereby cause the table to be raised or lowered, a manually operable lever by which the controlling shaft may be manually operated and positive positioning means to releasably hold the controlling shaft in adjusted position.

2. A milling machine as claimed in claim 1, in which the positive positioning means to releasably hold the controlling shaft in adjusted positions comprises a segment on the controlling shaft and a spring projected detent element to yieldably engage the segment.

3. A milling machine as claimed in claim 1, in which the cams on the work table are longitudinally adjustable thereon.

4. A milling machine as claimed in claim 1, in which the positive positioning means to releasably hold the controlling shaft in adjusted positions comprises a segment on the controlling shaft and a spring projected detent element to yieldably engage the segment and a weight on said lever.

5. In a milling machine, a vertical movable frame, a work table movable longitudinally on the frame, a feeding device for automatically lowering the work table out of the path of the cutter before the start of the reverse stroke and for lifting the work table to the path of the cutter after the reverse stroke and comprising a reversing shaft, a curved cam disc on said reversing shaft, a vertical movable controlling bolt geared to the reversing shaft and spaced cams on the longitudinally movable work table and arranged to move said bolt upwardly or downwardly according to the direction of longitudinal movement of the table and thereby cause the table to be raised or lowered.

6. In a milling machine, a vertical movable frame, a work table movable longitudinally on the frame, a feeding device for automatically lowering the work table out of the path of the cutter before the start of the reverse stroke and for lifting the work table to the path of the cutter after the reverse stroke and comprising a reversing shaft, a curved cam disc on said reversing shaft, a vertical movable controlling bolt geared to the reversing shaft and spaced cams on the longitudinally movable work table and arranged to move said bolt upwardly or downwardly according to the direction of longitudinal movement of the table and thereby cause the table to be raised or lowered, a manually revoluble shaft geared to the shaft which raises and lowers the table, and a preadjustable coupling including a member fast on the manually revoluble shaft and a member loose on said shaft, and having an operating arm actuated by the curved cam disc.

7. In a milling machine, a vertical movable frame, a work table movable longitudinally on the frame, a feeding device for automatically lowering the work table out of the path of the cutter before the start of the reverse stroke and for lifting the work table to the path of the cutter after the reverse stroke and comprising a reversing shaft, a curved cam disc on said reversing shaft, a vertical movable controlling bolt geared to the reversing shaft and spaced cams on the longitudinally movable work table and arranged to move said bolt upwardly or downwardly according to the direction of longitudinal movement of the table and thereby cause the table to be raised or lowered, a manually revoluble shaft geared to the shaft which raises and lowers the table, and a preadjustable coupling comprising a friction cone coupling, one cone of which moves with a roller in the curve disc and which is supported loosely on the said shaft, and a second cone which is axially shiftable on the said shaft and a manually adjustable sleeve by which the last named cone may be coupled to the first named cone.

In witness whereof I affix my signature.

OSCAR HOPPE.